United States Patent
Ozawa et al.

(10) Patent No.: US 9,029,474 B2
(45) Date of Patent: May 12, 2015

(54) PROCESS FOR PRODUCTION OF SURFACE-MODIFIED POLYMER STRUCTURES

(75) Inventors: Masaaki Ozawa, Funabashi (JP); Keisuke Odoi, Chiyoda-ku (JP); Hironori Atarashi, Fukuoka (JP); Kei-ichi Akabori, Fukuoka (JP); Toshihiko Nagamura, Fukuoka (JP); Keiji Tanaka, Fukuoka (JP)

(73) Assignees: Nissan Chemical Industries, Ltd., Tokyo (JP); Kyushu University, Fukuoka-shi (JP)

( * ) Notice: Subject to any disclaimer, the term of this patent is extended or adjusted under 35 U.S.C. 154(b) by 422 days.

(21) Appl. No.: 12/450,778

(22) PCT Filed: Apr. 23, 2008

(86) PCT No.: PCT/JP2008/057874
§ 371 (c)(1),
(2), (4) Date: Dec. 15, 2009

(87) PCT Pub. No.: WO2008/133283
PCT Pub. Date: Nov. 6, 2008

(65) Prior Publication Data
US 2010/0120984 A1     May 13, 2010

(30) Foreign Application Priority Data
Apr. 25, 2007   (JP) ................ 2007-115883

(51) Int. Cl.
*C08L 51/00*   (2006.01)
*C08L 41/00*   (2006.01)
*C08J 7/12*    (2006.01)
*C08L 101/00*  (2006.01)

(52) U.S. Cl.
CPC ............... *C08J 7/12* (2013.01); *C08L 101/005* (2013.01)

(58) Field of Classification Search
CPC ..... C08L 101/005; C08L 101/025; C08J 7/12
USPC ......................................................... 525/77
See application file for complete search history.

(56) References Cited

U.S. PATENT DOCUMENTS

| 5,357,005 | A  | 10/1994 | Buchwalter et al. |
| 6,497,959 | B1 | 12/2002 | Mhetar |
| 6,617,397 | B2 | 9/2003  | McNamara et al. |
| 2002/0155311 | A1* | 10/2002 | Mayes et al. ............. 428/522 |
| 2006/0035091 | A1  | 2/2006  | Bruchmann et al. |
| 2009/0163657 | A1* | 6/2009  | Tanaka et al. ............. 525/55 |

FOREIGN PATENT DOCUMENTS

| EP | 1 854 814 A1 | 11/2007 |
| JP | A-5-247198 | 9/1993 |
| JP | A-11-263819 | 9/1999 |
| JP | A-2002-145971 | 5/2002 |
| JP | A-2003-522266 | 7/2003 |
| JP | A-2003-529658 | 10/2003 |
| JP | A-2004-346203 | 12/2004 |
| JP | A-2005-511875 | 4/2005 |
| JP | A-2005-511876 | 4/2005 |
| JP | A-2006-503947 | 2/2006 |
| JP | A-2006-113389 | 4/2006 |
| JP | A-2006-316169 | 11/2006 |
| WO | WO 2006/093050 A1 | 9/2006 |
| WO | WO 2007/049608 A1 | 5/2007 |
| WO | WO 2008/029806 A1 | 3/2008 |

OTHER PUBLICATIONS

Walton and Mayes, Physical Review E, vol. 54, No. 3, pp. 28112815 (Sep. 1996).*
International Search Report issued in International Patent Application No. PCT/JP2008/057874; mailed Aug. 5, 2008.
Ishizu et al., "Synthesis of hyperbranched polymers by self-addition free radical vinyl polymerization of photo functional styrene," Macromol Rapid Commun; vol. 21, No. 10, 2000; pp. 665-668.
Ishizu et al., "Synthesis and characterization of hyperbranched poly(ethyl methacrylate) by quasi-living radical polymerization of photofunctional inimer," Polymer International; vol. 51, 2002; pp. 424-428.
Atarashi et al., "Interfacial Segregation of Hyper-branched Polystyrene in Mixtures of Linear Component," Transactions of the Materials Research Society of Japan, vol. 32, No. 1, 2007, pp. 231-234.

* cited by examiner

*Primary Examiner* — Jeffrey Mullis
(74) *Attorney, Agent, or Firm* — Oliff PLC

(57) ABSTRACT

The present invention relates to a process for producing a polymer structure comprising: mixing and unifying a matrix polymer made of a linear polymer and a highly-branched polymer having hydrophilic functional groups at molecular ends and to form a structure containing the matrix polymer and the highly-branched polymer; and subjecting the obtained structure to either immersion in water and/or a hydrophilic solvent or exposure to an atmosphere of vapor of water and/or a hydrophilic solvent at a temperature ranging from a temperature lower than Tg of the matrix polymer by 30° C. to decomposition temperature of the matrix polymer; wherein the hydrophilic functional groups at the molecular ends of the highly-branched polymer are distributed in outermost surface of the polymer structure at an enhanced density. The present invention also relates to a process for producing a polymer structure in which vinyl polymer chains are grafted to at least a part of the hydrophilic functional groups.

39 Claims, 1 Drawing Sheet

PROCESS FOR PRODUCTION OF SURFACE-MODIFIED POLYMER STRUCTURES

TECHNICAL FIELD

The present invention relates to a novel technology applicable to a surface modification of a polymer. The surface-modified polymer structure or grafted polymer structure according to the present invention has such characteristics as capability of imparting wear resistance, lubricity, chemical resistance, anticorrosion property, antistatic property, adhesion/cohesion, light antireflection property, light opacity and etching resistance to the surface of the structure and capability of controlling hydrophilicity/lipophilicity, a light reflectance, a light extraction efficiency, alkali developing property, surface hardness and the like. Therefore, these structures can be suitably utilized as: a molding material such as electric/electronic parts, automobile parts, optical controlling parts, parts for printing apparatuses, film/sheet materials, fiber materials and medicine/diagnose materials; a thin film material such as semiconductor materials, display materials and materials for electronic devices; and gradient materials in which refractive index, dielectric constant, thermal expansion coefficient, magnetic property and the like are controlled.

BACKGROUND ART

Recently, polymer materials are increasingly utilized in various fields. Following such a tendency, corresponding to each need, besides properties of a polymer as a matrix, surface characteristics of the polymer are becoming important. For example, characteristics such as adhesion, cohesion, non-adhesiveness, antistatic properties, water-/oil-repellent properties, hydrophilicity, sliding properties and biocompatibility are required for the surface of a polymer.

Conventionally, various polymer surface modifying methods for imparting the above characteristics to the surface of a polymer are known (for example, Non-patent Document 1). For example, there is known a method for taking a physical measure represented by the irradiation of various energy rays, however, it requires cumbersome operations to become an expensive method (for example, Patent Document 1 and Patent Document 2).

The same applicants as those of the present invention disclose that as a polymer surface modifying method, by such a simple operation as mixing a highly-branched polymer to a matrix polymer made of a linear polymer, a highly-branched polymer can be concentrated on the surface and/or the interface of the matrix polymer (for example, Non-patent Document 2).

However, in this report, there is no description on distributing hydrophilic functional groups at the molecular ends of the highly-branched polymer in the outermost surface of a polymer structure at an enhanced density, and there is not indicated an action effect by this distribution.

In addition, for the purpose of modifying a polymer surface, there is known a method of adding or applying a highly-branched polymer, however, there is no description on distributing functional groups at the molecular ends of the highly-branched polymer in the outermost surface of a polymer structure at an enhanced density (for example, Patent Document 7, Patent Document 8 and Patent Document 9).

In addition, as one of polymer surface modifying methods, there is known a method of grafting a polymer chain through a polymerization initiating group formed in the surface of a solid (for example, Patent Document 3, Patent Document 4 and Patent Document 5). This surface modifying method by a surface graft polymerization can impart diverse surface characteristics by varying the type of a monomer to be polymerized. However, in these documents, a method of fixing a polymerization initiating group to the surface requires a cumbersome step such as the Langmuir-Blodgett method (LB method) and a chemisorption method, so that there has been desired a method capable of performing a polymer surface modification for a wider surface area by a simple step. In addition, a surface modifying method by fixing a dithiocarbamate group which is a photopolymerization initiating group to the polymer surface by the LB method or a chemisorption method to graft-polymerize the polymer, is publicly-known (for example, Patent Document 6).

However, in these documents, there is no description on technical methods and means of distributing hydrophilic functional groups at the molecular ends of a highly-branched polymer contained in a polymer structure and concentrated on the surface and/or the interface of the polymer structure in the outermost surface of the polymer structure at an enhanced density, so as to further graft polymer chains to the hydrophilic functional groups distributed in the outermost surface at an enhanced density. Also, there is no indication of advantageous effects obtained by these technical methods and means.

In addition, as a highly-branched polymer having a dithiocarbamate group at the molecular ends, there are known styrene-based hyperbranched polymers and acryl-based hyperbranched polymers (for example, Non-patent Document 3 and Non-patent Document 4).

Non-patent Document 1: Edited by Teruo Tsunoda, *Kobunshi no Hyomenkaishitsu to Oyo* (Surface Modification of Polymer and Application Thereof), published by CMC Publishing Co., Ltd. in June, 2001

Non-patent Document 2: Transactions of the Materials Research Society of Japan Vol. 32(1), p.p. 231 (2007)

Non-patent Document 3: Macromol. Rapid Commun. Vol. 21, p.p. 665 to 668 (2000)

Non-patent Document 4: Polymer International Vol. 51, p.p. 424 to 428 (2002)

Patent Document 1: JP-T-2005-511875

Patent Document 2: JP-T-2005-511876

Patent Document 3: Japanese Patent Application Publication No. JP-A-11-263819

Patent Document 4: JP-T-2002-145971

Patent Document 5: Japanese Patent Application Publication No. JP-A-2006-316169

Patent Document 6: Japanese Patent Application Publication No. JP-A-2006-113389

Patent Document 7: JP-T-2003-522266

Patent Document 8: JP-T-2003-529658

Patent Document 9: JP-T-2006-503947

DISCLOSURE OF THE INVENTION

[Problems to be Solved by the Invention]

In order to solve the problems described above, it is an object of the present invention to provide a novel and simple general-purpose technology capable of modifying the surface of a polymer structure, in which highly-branched polymers having hydrophilic functional groups at the molecular ends are contained in a matrix polymer made of a linear polymer, by distributing hydrophilic functional groups at the molecular ends of the highly-branched polymer in the outermost surface of the polymer structure at an enhanced density, and further, by a surface graft polymerization.

Means for Solving the Problems

As a result of assiduous research intended to achieve the above object, the present inventors have found that by subjecting a polymer structure containing a matrix polymer made of a linear polymer and a highly-branched polymer to a treatment at a specific temperature and in a specific atmosphere, it is possible to distribute hydrophilic functional groups at the molecular ends of the highly-branched polymer in the outermost surface of the polymer structure at an enhanced density, and that by graft-polymerizing the outermost surface of the polymer structure, it is possible to modify the surface of the polymer structure, then the present inventors have completed the present invention.

That is, the present invention is, according to a first aspect, a process for producing a polymer structure in which a highly-branched polymer having hydrophilic functional groups at the molecular ends is contained in a matrix polymer made of a linear polymer includes: mixing and unifying the matrix polymer and the highly-branched polymer to form a structure containing the matrix polymer and the highly-branched polymer; and subjecting the obtained structure containing the matrix polymer and the highly-branched polymer to either immersion in water and/or a hydrophilic solvent or exposure to an atmosphere of vapor of water and/or a hydrophilic solvent at a temperature falling within the range of a temperature lower than the glass transition temperature of the matrix polymer by 30° C. to the decomposition temperature of the matrix polymer; in which the hydrophilic functional groups at the molecular ends of the highly-branched polymer are distributed in the outermost surface of the polymer structure at an enhanced density;

according to a second aspect, the process for producing a polymer structure according to the first aspect, characterized in that the highly-branched polymer is at least one type selected from a group consisting of a dendritic polymer, a comb polymer and a hyperbranched polymer;

according to a third aspect, the process for producing a polymer structure according to the second aspect, characterized in that the hyperbranched polymer is a hyperbranched polymer represented by Formula (1):

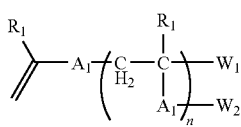

(1)

(where $R_1$ represents a hydrogen atom or a methyl group; $W_1$ and $W_2$ independently represent a thiol group, a halogen atom, an amino group or a dithiocarbamate group; $A_1$ represents a group represented by Formula (2) and/or Formula (3):

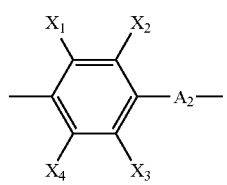

(2)

-continued

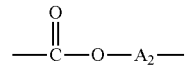

(3)

(where $A_2$ represents a straight chain, branched or cyclic alkylene group having 1 to 30 carbon atom(s) which may contain an ether bond or an ester bond; and $X_1$, $X_2$, $X_3$ and $X_4$ independently represent a hydrogen atom, an alkyl group having 1 to 20 carbon atom(s), an alkoxy group having 1 to 20 carbon atom(s), a halogen atom, a nitro group, a hydroxyl group, an amino group, a carboxyl group or a cyano group); and n is a number of repeating unit structures and represents an integer of 2 to 100,000);

according to a fourth aspect, the process for producing a polymer structure according to the third aspect, in which $A_1$ represents a group represented by Formula (4):

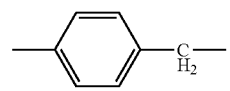

(4)

according to a fifth aspect, the process for producing a polymer structure according to the third aspect, in which $A_1$ represents a group represented by Formula (5):

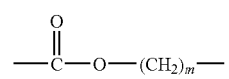

(5)

(where m represents an integer of 2 to 10);

according to a sixth aspect, the process for producing a polymer structure according to any one of the third aspect to the fifth aspect, in which each of $W_1$ and $W_2$ is a dithiocarbamate group;

according to a seventh aspect, the process for producing a polymer structure according to any one of the third aspect to the fifth aspect, in which $R_1$ is a hydrogen atom;

according to an eighth aspect, the process for producing a polymer structure according to the fourth aspect, in which each of $W_1$ and $W_2$ is a dithiocarbamate group and $R_1$ is a hydrogen atom;

according to a ninth aspect, the process for producing a polymer structure according to any one of the third aspect to the eighth aspect, in which the matrix polymer is at least one type selected from a group consisting of polystyrene, an AS resin, an ABS resin, an MS resin, an acrylic resin and a methacrylic resin;

according to a tenth aspect, the process for producing a polymer structure according to the ninth aspect, in which the matrix polymer is polystyrene;

according to an eleventh aspect, the process for producing a polymer structure according to the first aspect, in which a treating time for the immersion or the exposure is 0.001 to 100 hours;

according to a twelfth aspect, the process for producing a polymer structure according to the first aspect, in which the amount of the highly-branched polymer mixed to the matrix polymer is maximum 25% by mass to minimum 0.1% by mass, based on the mass of the matrix polymer;

according to a thirteenth aspect, a polymer structure in which a highly-branched polymer having hydrophilic functional groups at the molecular ends is contained in a matrix polymer made of a linear polymer, characterized in that the highly-branched polymer is concentrated around the surface and/or the interface of the polymer structure and the hydrophilic functional groups at the molecular ends of the highly-branched polymer are distributed in the outermost surface of the polymer structure at an enhanced density;

according to a fourteenth aspect, the polymer structure according to the thirteenth aspect, characterized in that the highly-branched polymer is at least one type selected from a group consisting of a dendritic polymer, a comb polymer and a hyperbranched polymer;

according to a fifteenth aspect, the polymer structure according to the fourteenth aspect, characterized in that the hyperbranched polymer is a hyperbranched polymer represented by Formula (1);

according to a sixteenth aspect, the polymer structure according to the fifteenth aspect, in which $A_1$ represents a group represented by Formula (4);

according to a seventeenth aspect, the polymer structure according to the fifteenth aspect, in which $A_1$ represents a group represented by Formula (5);

according to an eighteenth aspect, the polymer structure according to any one of the fifteenth aspect to the seventeenth aspect, in which each of $W_1$ and $W_2$ is a dithiocarbamate group;

according to a nineteenth aspect, the polymer structure according to any one of the fifteenth aspect to the seventeenth aspect, in which $R_1$ is a hydrogen atom;

according to a twentieth aspect, the polymer structure according to the sixteenth aspect, in which each of $W_1$ and $W_2$ is a dithiocarbamate group and $R_1$ is a hydrogen atom;

according to a twenty-first aspect, the polymer structure according to any one of the fifteenth aspect to the twentieth aspect, in which the matrix polymer is at least one type selected from a group consisting of polystyrene, an AS resin, an ABS resin, an MS resin, an acrylic resin and a methacrylic resin;

according to a twenty-second aspect, the polymer structure according to the twenty-first aspect, in which the matrix polymer is polystyrene;

according to a twenty-third aspect, a process for producing a grafted polymer structure which is a polymer structure in which a highly-branched polymer having hydrophilic functional groups at the molecular ends is contained in a matrix polymer made of a linear polymer includes: mixing and unifying the matrix polymer and the highly-branched polymer to form a structure containing the matrix polymer and the highly-branched polymer; subjecting the obtained structure containing the matrix polymer and the highly-branched polymer to either immersion in water and/or a hydrophilic solvent or exposure to an atmosphere of vapor of water and/or a hydrophilic solvent at a temperature falling within the range of a temperature lower than the glass transition temperature of the matrix polymer by 30° C. to the decomposition temperature of the matrix polymer; and graft-polymerizing vinyl polymer chains to hydrophilic functional groups positioned in the outermost surface of the treated structure; in which the hydrophilic functional groups at the molecular ends of the highly-branched polymer are distributed in the outermost surface of the polymer structure at an enhanced density and the vinyl polymer chains are grafted to at least a part of the hydrophilic functional groups;

according to a twenty-fourth aspect, the process for producing a grafted polymer structure according to the twenty-third aspect, characterized in that the highly-branched polymer is at least one type selected from a group consisting of a dendritic polymer, a comb polymer and a hyperbranched polymer;

according to a twenty-fifth aspect, the process for producing a grafted polymer structure according to the twenty-fourth aspect, characterized in that the hyperbranched polymer is a hyperbranched polymer represented by Formula (1);

according to a twenty-sixth aspect, the process for producing a grafted polymer structure according to the twenty-fifth aspect, in which $A_1$ represents a group represented by Formula (4);

according to a twenty-seventh aspect, the process for producing a grafted polymer structure according to the twenty-fifth aspect, in which $A_1$ represents a group represented by Formula (5);

according to a twenty-eighth aspect, the process for producing a grafted polymer structure according to any one of the twenty-fifth aspect to the twenty seventh aspect, in which each of $W_1$ and $W_2$ is a dithiocarbamate group;

according to a twenty-ninth aspect, the process for producing a grafted polymer structure according to any one of the twenty-fifth aspect to the twenty-seventh aspect, in which $R_1$ is a hydrogen atom;

according to a thirtieth aspect, the process for producing a grafted polymer structure according to the twenty-sixth aspect, in which each of $W_1$ and $W_2$ is a dithiocarbamate group and $R_1$ is a hydrogen atom;

according to a thirty-first aspect, the process for producing a grafted polymer structure according to any one of the twenty-fifth aspect to the thirtieth aspect, in which the matrix polymer is at least one type selected from a group consisting of polystyrene, an AS resin, an ABS resin, an MS resin, an acrylic resin and a methacrylic resin;

according to a thirty-second aspect, the process for producing a grafted polymer structure according to the thirty-first aspect, in which the matrix polymer is polystyrene;

according to a thirty-third aspect, the process for producing a grafted polymer structure according to the twenty-third aspect, in which a treating time for the immersion or the exposure is 0.001 to 100 hours;

according to a thirty-fourth aspect, the process for producing a grafted polymer structure according to the twenty-third aspect, in which the amount of the highly-branched polymer mixed to the matrix polymer is maximum 25% by mass to minimum 0.1% by mass, based on the mass of the matrix polymer;

according to a thirty-fifth aspect, the process for producing a grafted polymer structure according to the twenty-third aspect, characterized in that each of the vinyl polymer chains is grafted by a living radical polymerization;

according to a thirty-sixth aspect, the process for producing a grafted polymer structure according to the thirty-fifth aspect, in which a polymerization time for the living radical polymerization is 0.01 to 100 hours;

according to a thirty-seventh aspect, the process for producing a grafted polymer structure according to the thirty-fifth aspect, in which a polymerization time for the living radical polymerization is 0.1 to 100 hours;

according to a thirty-eighth aspect, the process for producing a grafted polymer structure according to the thirty-fifth aspect, in which a polymerization temperature for the living radical polymerization is 0 to 200° C.;

according to a thirty-ninth aspect, the process for producing a grafted polymer structure according to the twenty-fifth aspect, characterized in that each of the vinyl polymer chains is formed from acrylamides or methacrylamides;

according to a fortieth aspect, a grafted polymer structure which is a polymer structure in which a highly-branched polymer having hydrophilic functional groups at the molecular ends is contained in a matrix polymer made of a linear polymer, characterized in that: the highly-branched polymer is concentrated around the surface and/or the interface of the polymer structure; the hydrophilic functional groups at the molecular ends of the highly-branched polymer are distributed in the outermost surface of the polymer structure at an enhanced density; and vinyl polymer chains are grafted to at least a part of the hydrophilic functional groups;

according to a forty-first aspect, the grafted polymer structure according to the fortieth aspect, characterized in that the highly-branched polymer is at least one type selected from a group consisting of a dendritic polymer, a comb polymer and a hyperbranched polymer;

according to a forty-second aspect, the grafted polymer structure according to the forty-first aspect, characterized in that the hyperbranched polymer is a hyperbranched polymer represented by Formula (1);

according to a forty-third aspect, the grafted polymer structure according to the forty-second aspect, in which $A_1$ represents a group represented by Formula (4);

according to a forty-fourth aspect, the grafted polymer structure according to the forty-second aspect, in which $A_1$ represents a group represented by Formula (5);

according to a forty-fifth aspect, the grafted polymer structure according to any one of the forty-second aspect to the forty-fourth aspect, in which each of $W_1$ and $W_2$ is a dithiocarbamate group;

according to a forty-sixth aspect, the grafted polymer structure according to any one of the forty-second aspect to the forty-fourth aspect, in which $R_1$ is a hydrogen atom;

according to a forty-seventh aspect, the grafted polymer structure according to the forty-third aspect, in which each of $W_1$ and $W_2$ is a dithiocarbamate group and $R_1$ is a hydrogen atom;

according to a forty-eighth aspect, the grafted polymer structure according to any one of the forty-second aspect to the forty-seventh aspect, in which the matrix polymer is at least one type selected from a group consisting of polystyrene, an AS resin, an ABS resin, an MS resin, an acrylic resin and a methacrylic resin;

according to a forty-ninth aspect, the grafted polymer structure according to the forty-eighth aspect, in which the matrix polymer is polystyrene;

according to a fiftieth aspect, the grafted polymer structure according to the fortieth aspect, characterized in that each of the vinyl polymer chains is formed from acrylamides or methacrylamides; and according to a fifty-first aspect, the grafted polymer structure according to the fortieth aspect, characterized in that each of the vinyl polymer chains is grafted by a living radical polymerization.

Effects of the Invention

According to the present invention, only by subjecting a polymer structure in which a matrix polymer made of a linear polymer and a highly-branched polymer having hydrophilic functional groups at the molecular ends are mixed to a treatment under simple conditions, the hydrophilic functional groups at the molecular ends of the highly-branched polymer are distributed in the outermost surface of the structure at an enhanced density, and further if necessary, by grafting desired polymer chains to the hydrophilic functional groups, there can be obtained a polymer structure in which various surface characteristics are modified according to a need for the matrix polymer.

Particularly, when as the highly-branched polymer, a hyperbranched polymer having a dithiocarbamate group acting as a photopolymerization initiator at the molecular end is used, there can be obtained a grafted polymer structure surface-modified with vinyl polymers such as acrylamides and methacrylamides by a surface graft (living radical) polymerization.

BEST MODES FOR CARRYING OUT THE INVENTION

Hereinafter, the present invention will be described more in detail.

The process for producing a polymer structure according to the present invention in which hydrophilic functional groups at the molecular ends of a highly-branched polymer are distributed in the outermost surface of the polymer structure at an enhanced density is a process including: mixing and unifying a matrix polymer made of a linear polymer and a highly-branched polymer having hydrophilic functional groups at the molecular ends to form a structure containing the matrix polymer and the highly-branched polymer; and subjecting the obtained structure containing the matrix polymer and the highly-branched polymer to either immersion in water and/or a hydrophilic solvent or exposure to an atmosphere of vapor of water and/or a hydrophilic solvent at a temperature falling within the range of a temperature lower than the glass transition temperature of the matrix polymer by 30° C. to the decomposition temperature of the matrix polymer As the matrix polymer made of a linear polymer used in the process for the production according to the present invention, various types of polymers can be used. Examples of the polymer used include vinyl chloride resins, vinylidene chloride resins, vinyl acetate resins, polyvinyl alcohol, polyvinyl acetal, polystyrene, AS resins (copolymer compounds of acrylonitrile and styrene), ABS resins (copolymer compounds of acrylonitrile, butadiene and styrene), MS resins (copolymer compounds of methyl methacrylate and styrene), acrylic resins, methacrylic resins, polyethylene, polypropylene, fluorine resins, polyamide, polyacetal, polycarbonate, modified polyphenylene ether, polysulfone, polyester, polyphenylene sulfide, liquid crystal plastics, polyimide, polyurethane, silicone resins, diaryl phthalate resins, polybutadiene, polyisoprene, natural rubbers, chloroprene rubbers, ethylene-propylene rubbers, nitrilebutadiene rubbers, fluorine rubbers and butyl rubbers, and also includes copolymers of these polymers. Needless to say, however, examples of the polymer used are not limited to these examples.

The highly-branched polymer having hydrophilic functional groups at the molecular ends used in the process for the production according to the present invention is characterized by having hydrophilic functional groups at the end groups of the highly-branched polymer. It is preferred that all of the end groups are hydrophilic functional groups, however, only a part of the end groups may be hydrophilic functional groups. Examples of the hydrophilic functional groups include a hydroxyl group, a carboxyl group, an amino group, a thiol group, a halogen atom, an epoxy group and a dithiocarbamate group, and these groups may be mixed as a combination of two or more types thereof.

The highly-branched polymer is a polymer exhibiting a molecule structure in which the molecule spreads not in a single direction, but in a plurality of directions, and generally refers to a polymer known as a multi-branched polymer, that is, a dendritic polymer, a comb polymer or a hyperbranched polymer. These polymers may be used in combination of two or more types thereof.

Here, the dendritic polymer (dendritic macromolecule) is a sphere-shaped macromolecule generally known as a dendrimer in which the molecules radiate. In addition, the comb polymer is a polymer composed of a comb-shaped molecular structure as a whole in which side groups (side chains) are relatively regularly bonded to the backbone. Further, the hyperbranched polymer is a polymer composed of a highly branched structure and most of the hyperbranched polymer is synthesized generally by a self-condensation of an $AB_2$-type monomer. However, the principle of the present invention is not limited to the above multi-branched polymers and as is apparent from the below descriptions, the present invention can be conducted using any type of macromolecular compounds so long as the macromolecular compounds have branched parts and the molecules spreading in a plurality of directions, with the proviso that there exists a variation of the effect.

The hyperbranched polymer generally refers to a compound produced by polymerizing an $AB_x$-type compound having in one molecule thereof, both one A functional group and two or more B functional groups capable of being reacted with the A functional group such as $AB_2$ and $AB_3$, or a compound combining one polymerizing site and one initiator which is referred to as AB*-type, utilizing condensation, addition or insertion reaction, and is a highly branched polymer. The AB*-type molecule is a compound in which an A functional group corresponding to a polymerizing site and a B* functional group acting as an initiator are reacted with each other and after the reaction, the A functional group disappears, however, B* maintains the reactivity as B* by an elimination or addition even after the reaction. Here, examples of the $AB_2$-type include a combination of a carboxyl group as the A functional group and an amino group as the B functional group and in this case, the produced hyperbranched polymer becomes a hyperbranched polyamide. Examples of the AB*-type include a combination of a styrenic double bond as the A functional group and a dithiocarbamate group as the B* functional group and in this case, the produced hyperbranched polymer becomes a hyperbranched polystyrene. Examples of the AB*-type also include a combination of a methacrylic double bond as the A functional group and a dithiocarbamate group as the B* functional group and in this case, the produced hyperbranched polymer becomes a hyperbranched polymethacrylate.

Preferred examples of the hyperbranched polymer having hydrophilic functional groups at the molecular ends used in the process for the production according to the present invention include polymers represented by Formula (1).

In Formula (1), as $W_1$ and $W_2$ representing hydrophilic functional groups at the molecular ends, a dithiocarbamate group is preferred taking into consideration the fact that a dithiocarbamate group can be living radical-polymerized.

Examples of the hyperbranched polymer having dithiocarbamate groups at the molecular ends include hyperbranched polymers represented by Formulae (6) to (8) and hyperbranched polymers constituted by units represented by Formulae (9) to (11), but are not limited thereto.

The hyperbranched polymers represented by Formulae (6) to (8) and the hyperbranched polymers constituted by units represented by Formulae (9) to (11) are available from Nissan Chemical Industries, Ltd. under a trade name of OPTBEADS Series.

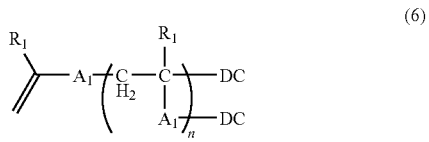

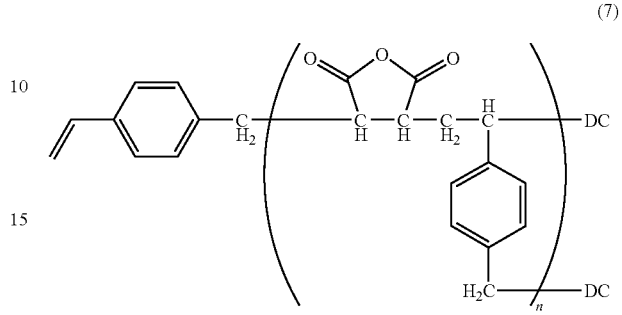

(where $R_1$, $A_1$ and n represent the same as those defined in Formula (1); and DC represents a dithiocarbamate group).

A hyperbranched polymer by represented Formula (6) in which $A_1$ represents a group represented by Formula (4) and/or Formula (5) is preferred.

In addition, as the hyperbranched polymer having dithiocarbamate groups at the molecular ends, copolymerization-type hyperbranched polymers represented by Formula (7) and Formula (8) can also be used.

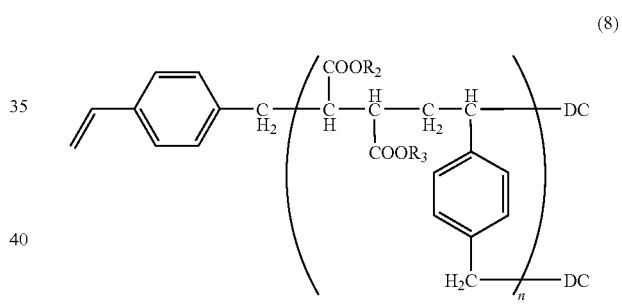

(where DC represents a dithiocarbamate group; and n represents the number of repeating unit structures and is an integer of 2 to 100,000).

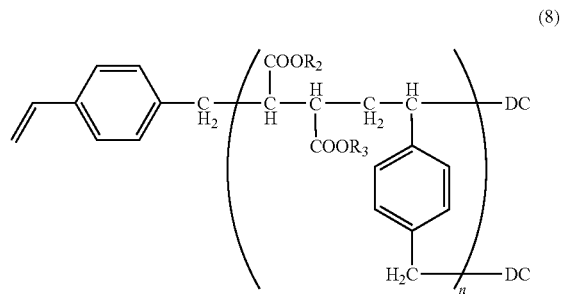

(where DC represents a dithiocarbamate group; n represents the number of repeating unit structures and is an integer of 2 to 100,000; and $R_2$ and $R_3$ individually represent a hydrogen atom or a metal atom).

Further, as the hyperbranched polymer having dithiocarbamate groups at the molecular ends, there can also be used a hyperbranched polymer having a structural formula represented by Formula (9) as the polymerization initiating site, a repeating unit in a straight chain structure represented by Formula (10) and a repeating unit in a branched structure represented by Formula (11), where the total number of the repeating units in a straight chain structure represented by Formula (10) is an integer of 1 to 100,000 and the total number of the repeating units in a branched structure represented by Formula (11) is an integer of 2 to 100,000.

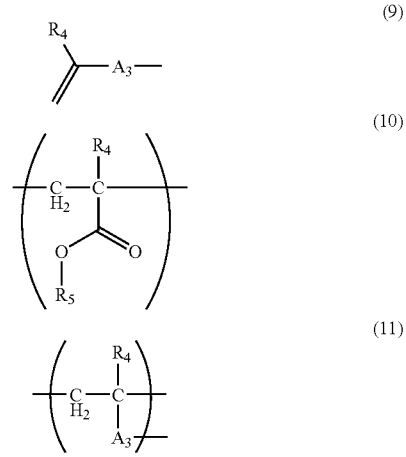

(in Formulae (9) to (11), $R_4$ represents a hydrogen atom or a methyl group; $R_5$ represents a hydrogen atom, a straight chain or branched hydroxyalkyl group having 1 to 20 carbon atom(s) or a straight chain or branched alkyl group having 3 to 20 carbon atoms and containing an epoxy group; and $A_3$ represents a structure represented by Formula (12) or Formula (13):

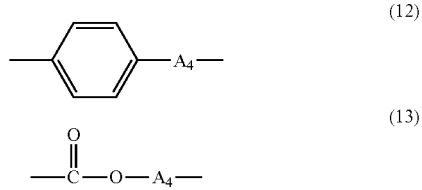

(in Formula (12) and Formula (13), $A_4$ represents a straight chain, branched or cyclic alkylene group having 1 to 20 carbon atom(s) which may contain an ether bond or an ester bond).

In the process for the production of the present invention, a matrix polymer made of a linear polymer is mixed with a highly-branched polymer having hydrophilic functional groups at the molecular ends to be used. The linear polymer and the highly-branched polymer having hydrophilic functional groups at the molecular ends to be used are preferably those having chemical structures of the constituting units which are the same as or similar to each other. For example, when the hyperbranched polymer represented by Formula (1) is used, polystyrene, an AS resin, an ABS resin, an MS resin, an acrylic resin and a methacrylic resin can be preferably used.

In addition, the process of the present invention can also be applied even when both types of polymers are not necessarily in the above-described relationship. In other words, by using a system in which an apparent phase-separation structure is not formed when the linear polymer is mixed with the highly-branched polymer having hydrophilic functional groups at the molecular ends, the process of the present invention can be applied to any system.

The amount of the highly-branched polymer having hydrophilic functional groups at the molecular ends to be mixed with the matrix polymer is generally 25% by mass, preferably 15% by mass, more preferably 10% by mass as the maximum mixed amount of the highly-branched polymer, based on the mass of the matrix polymer. In addition, the minimum mixed amount is 0.1% by mass, preferably 0.5% by mass, more preferably 1% by mass.

When the amount is within the above range of the mixed amount, a state in which the hydrophilic functional groups at the molecular ends of the highly-branched polymer are distributed in the outermost surface of the polymer structure at an enhanced density can be effectively formed.

Here, in connection with the description of the present invention, "outermost surface" means the most outer surface of the polymer structure and means, for example an interface between the polymer structure and a gas (usually air) or a liquid (water and/or hydrophilic solvents etc.). The state in which hydrophilic functional groups at the molecular ends that the highly-branched polymer has are distributed in the outermost surface of the polymer structure at an enhanced density means that the hydrophilic functional groups at the molecular ends of the highly-branched polymer component is at a detectable level when the polymer structure is subjected to a surface analysis by an X-ray photoelectronic spectrometry (XPS). When the highly-branched polymer having a dithiocarbamate group as a hydrophilic functional group is concentrated on the surface and/or the interface of the polymer structure at a density enhanced to a detectable level by the XPS and the dithiocarbamate group is distributed in the outermost surface of the polymer structure, the dithiocarbamate group can effectively act as a photopolymerization initiator, so that vinyl polymer chains can be grafted to the dithiocarbamate group positioned in the outermost surface of the polymer structure at an enhanced density.

There is described a step (hereinafter, abbreviated as "a first step") of mixing and unifying a matrix polymer made of a linear polymer and a highly-branched polymer having hydrophilic functional groups at the molecular ends to form a structure containing the matrix polymer and the highly-branched polymer in the process for the production of the present invention.

Examples of the method for the first step include: a method of directly melt blending both polymers; a method of dissolving both polymers in a solvent to homogeneously mix both polymers and distilling-off the solvent; and a method of polymerizing a linear polymer acting as a matrix in the presence of the highly-branched polymer having hydrophilic functional groups at the molecular ends, but are not limited thereto. The solvent used in the case of using a solvent is not particularly limited so long as it is a solvent capable of dissolving both polymers. Examples of the solvent include: aromatic hydrocarbons such as benzene, toluene, xylene and ethylbenzene; ether compounds such as tetrahydrofuran and diethyl ether; ketone compounds such as acetone, methyl ethyl ketone, methyl isobutyl ketone and cyclohexanone; and aliphatic hydrocarbons such as n-heptane, n-hexane and cyclohexane. These solvents may be used individually or in combination of two or more types thereof.

Next, there is described a step (hereinafter, abbreviated as "a second step") of subjecting the structure containing the matrix polymer and the highly-branched polymer to either immersion in water and/or a hydrophilic solvent or exposure to an atmosphere of vapor of water and/or a hydrophilic solvent at a temperature falling within the range of a temperature lower than the glass transition temperature of the matrix polymer by 30° C. to the decomposition temperature of the matrix polymer.

The second step can be performed at a temperature falling within the range of a temperature lower than the glass transition temperature of the matrix polymer by 30° C. to the decomposition temperature of the matrix polymer.

The specific temperature range depends on the type of the matrix polymer, however, it is preferably 0 to 200° C., more preferably 50 to 150° C.

As the hydrophilic solvent used in the second step, water and/or a hydrophilic solvent can be used, however, the hydrophilic solvent may be any solvent so long as it is a solvent miscible with water. Examples of the hydrophilic solvent include: alcohols such as methanol, ethanol, isopropanol and propanol; ethers such as dioxane, tetrahydrofuran and 1,2-dimethoxyethane; acetone; dimethylformamide; and dimethyl sulfoxide.

The time for immersion and exposure in the second step is 0.001 to 100 hours, preferably 0.1 to 50 hours.

Here, the second step can be accordingly performed within the range in which the polymer structure is not dissolved and a crack or the like is not caused.

Even only by the first step, the highly-branched polymer having hydrophilic functional groups at the molecular ends can be concentrated on the surface of the polymer structure to some extent, however, it is impossible to concentrate the highly-branched polymer at a density enhanced to a level detectable by the XPS.

According to the process for the production of the present invention, a polymer structure can be obtained, in which in the outermost surface of the polymer structure containing a matrix polymer made of a linear polymer and a highly-branched polymer having hydrophilic functional groups at the molecular ends, the hydrophilic functional groups at the molecular ends of the highly-branched polymer is distributed at a density enhanced to a level detectable by the XPS.

By the process for the production of the present invention, it is possible to distribute hydrophilic functional groups at the molecular ends of the highly-branched polymer in the outermost surface of the polymer structure at an enhanced density extremely efficiently.

Accordingly, the present invention provides a polymer structure in which hydrophilic functional groups at the molecular ends of the highly-branched polymer are distributed in the outermost surface of the polymer structure at an enhanced density.

The polymer structure of the present invention is not particularly limited in the form thereof and can take various forms such as a film, a membrane, a sheet, a sphere, a granular matter, a fiber and a molded form.

Further, the present invention provides a grafted polymer structure in which vinyl polymer chains are graft-polymerized to hydrophilic functional groups positioned in the outermost surface of the polymer structure.

In a polymer structure containing a highly-branched polymer having a dithiocarbamate group at the molecular ends acting as a photopolymerization initiator as the hydrophilic functional group, hydrophilic functional groups at the molecular ends of the highly-branched polymer are distributed in the outermost surface of the polymer structure at an enhanced density, so that by performing a living radical polymerization on the surface, vinyl polymer chains can be grafted to the dithiocarbamate group.

Examples of the monomers forming the vinyl polymer chains to be grafted include monomers having at least one graft-polymerizable vinyl group. Specific examples of the monomers include styrenes, vinylbiphenyls, vinylnaphthalenes, vinylanthracenes, acrylic acids, methacrylic acids, acrylic esters, methacrylic esters, acrylamides, methacrylamides, vinylpyrrolidones, acrylonitriles, maleic acids, maleimides, divinyl compounds and trivinyl compounds.

The surface grafting by a living radical polymerization can be performed by a publicly-known polymerization method such as a method for performing the polymerization in a bulk state in a monomer forming the vinyl polymer chain and a method for performing the polymerization in a solution state using water or an organic solvent.

The surface grafting by a living radical polymerization can be performed by heating or irradiating light such as a UV ray and is preferably performed by irradiating light such as a UV ray. In the living radical polymerization, it is necessary to thoroughly remove oxygen in the reaction system before the initiation of the polymerization and it is preferred to purge the inside of the system with an inert gas such as nitrogen and argon. Examples of the polymerization time include 0.1 to 100 hours, 1 to 50 hours and 3 to 30 hours. The polymerization temperature is not particularly limited, however, examples of the polymerization temperature include 0 to 200° C., 10 to 150° C. and 20 to 100° C.

During the living radical polymerization, for controlling the molecular mass or the distribution of the molecular mass, a chain transfer agent such as mercaptans and sulfides and a sulfide compound such as tetraethylthiuram disulfide can be used. Further, if desired, an antioxidant such as hindered phenols, a UV ray absorbing agent such as benzotriazoles and a polymerization inhibitor such as 4-tert-butyl catechol, hydroquinone, nitrophenol, nitrocresol, picric acid, phenothiazine and dithiobenzoyl disulfide can be used.

By the above method, a grafted polymer structure in which vinyl polymer chains are graft-polymerized to the outermost surface of the polymer structure can be obtained. In addition, when the graft polymerization is performed by irradiating light, a patterning of the graft-polymerized part is possible by using an appropriate mask.

EXAMPLES

The characteristics of the present invention will be further described in more detail referring to examples, which should not be construed as limiting the scope of the present invention.

Here, in the following description, for the X-ray photoelectron spectroscopy (XPS) measurement and the ultra violet light (UV) irradiation, the following apparatuses were used.

(1) X-ray photoelectron spectroscopy (XPS)

XPS, PHI5800 ESCA system (manufactured by Physical Electronics, Co., Ltd.)

(2) Ultra violet light (UV) irradiation

Mercury-Xenon lamp L8251 (manufactured by Hamamatsu Photonics K.K.)

Color filter UV-33 (manufactured by Toshiba Glass Co. Ltd.)

(3) Film thickness measurement

Ellipsometry apparatus M-150 (manufactured by JASCO Co., Ltd.)

Example 1

A hyperbranched polymer represented by Formula (14):

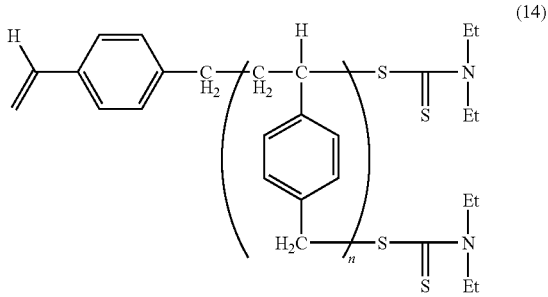

having dithiocarbamate groups at the molecular ends (trade name: OPTBEADS HPS; manufactured by Nissan Chemical Industries, Ltd.; Mn=4,900) and a linear polystyrene (PS) (manufactured by Sigma-Aldrich Corporation; Mn=1,550,000) were dissolved in a toluene solution so that the ratio (HPS/PS) is (HPS/PS)=(5/95 (w/w)).

The obtained solution was applied on a silicon substrate by a spin coating method and dried to prepare an (HPS/PS) blend film. Subsequently, the blend film (film thickness: 200 nm) was immersed in pure water and was subjected to thermal treatment at 358K (85° C.) for 15 hours while performing an argon bubbling. The surface aggregation structure of the blend film was evaluated by an X-ray photoelectron spectroscopy (XPS). The result is shown in FIG. 1.

For the surface graft polymerization using a dithiocarbamate group as an initiator, N-isopropylacrylamide (NIPAAm) (manufactured by Kanto Chemical Co., Inc.) was used as a monomer. The blend film was immersed in a 10% by mass NIPAAm aqueous solution which had been subjected to argon bubbling and the film was irradiated with an ultra violet light (UV) having a wavelength of 365 nm. The irradiation time and the illuminance were set to 24 hours and 5 mW/cm$^2$, respectively. The film after the UV irradiation was thoroughly cleaned using ethanol. The aggregation structure of the blend film surface both before and after the UV irradiation was evaluated by the XPS and the film thickness was evaluated by the depth analysis of the XPS measurement and by the ellipsometry measurement. The film thickness was found to be about 10 nm.

FIG. 1 is an XPS $N_{1s}$ spectrum for the blend film before and after the thermal treatment in water. From the finding that the strength of $N_{1s}$ ascribed to a dithiocarbamate groups at the molecular ends of HPS increases, it is apparent that by subjecting the blend film to thermal treatment in water, HPS is concentrated on the outermost surface of the (HPS/PS) blend film.

FIG. 2 is an XPS $C_{1s}$ spectrum before and after the graft polymerization. From the finding that a peak of a carbonyl carbon ascribed to NIPAAm was observed at around 288 eV, it can be concluded that a grafted layer of the polymer formed from NIPAAm was formed on the PS matrix. The thickness of the grafted layer could be arbitrarily controlled by varying the polymerization conditions. The wettability of the surface was largely enhanced.

Example 2

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 2 mW/cm$^2$ and an irradiation time of 2 hours, and the grafted polymer layer formed from NIPAAm was formed on the PS matrix.

Example 3

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 5 mW/cm$^2$ and an irradiation time of 2 hours, and the grafted polymer layer formed from NIPAAm was formed on the PS matrix.

Example 4

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 7 mW/cm$^2$ and an irradiation time of 24 hours, and the grafted polymer layer formed from NIPAAm was formed on the PS matrix.

Example 5

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 15 mW/cm$^2$ and an irradiation time of 3 hours, and the grafted polymer layer formed from NIPAAm was formed on the PS matrix.

Example 6

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 15 mW/cm$^2$ and an irradiation time of 24 hours, and the grafted polymer layer formed from NIPAAm was formed on the PS matrix.

Example 7

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 20 mW/cm$^2$ and an irradiation time of 24 hours, and the grafted polymer layer formed from NIPAAm was formed on the PS matrix.

Example 8

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film at the same temperature of 20° C. as that in Example 1 under such conditions as an illuminance of 25 mW/cm$^2$ and an irradiation time of 6 hours, and the grafted polymer layer formed from NIPAAm was formed on the PS matrix.

Example 9

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 30° C., an illuminance of 15 mW/cm$^2$ and an irradiation time of 6 hours, and the grafted polymer layer formed from NIPAAm was formed on the PS matrix.

Example 10

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 30° C., an illuminance of 15 mW/cm$^2$ and an irradiation time of 12 hours, and the grafted polymer layer formed from NIPAAm was formed on the PS matrix.

Example 11

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 30° C., an illuminance of 15 mW/cm$^2$ and an irradiation time of 40 hours, and the grafted polymer layer formed from NIPAAm was formed on the PS matrix.

Example 12

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 50° C., an illuminance of 15 mW/cm$^2$ and an irradiation time of 1 hour, and the grafted polymer layer formed from NIPAAm was formed on the PS matrix.

Example 13

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 50° C., an illuminance of 15 mW/cm$^2$ and an irradiation time of 3 hours, and the grafted polymer layer formed from NIPAAm was formed on the PS matrix.

Example 14

The (HPS/PS) blend film prepared in Example 1 was subjected to the thermal treatment according to substantially the same conditions and procedures as those in Example 1. Subsequently, a graft polymerization with NIPAAm was performed relative to the thermally treated (HPS/PS) blend film under such conditions as a temperature of 50° C., an illuminance of 15 mW/cm$^2$ and an irradiation time of 6 hours, and the grafted polymer layer formed from NIPAAm was formed on the PS matrix.

Example 15

The (HPS/PS) blend film prepared in substantially the same manner as in Example 1 was subjected to thermal treatment in an water-vapor atmosphere at 373K (100° C.) for 24 hours. The polymerization with NIPAAm was performed in substantially the same manner as in Example 1, and the grafted polymer layer formed from NIPAAm could be formed on the PS matrix.

Comparative Example 1

The (HPS/PS) blend film prepared in substantially the same manner as in Example 1 was not subjected to thermal treatment, and in this case, the surface fraction of the dithiocarbamate groups of the molecular ends of HPS was extremely low. A curve 1 in FIG. 3 shows an XPS N$_{1s}$ spectrum of the freshly-formed film. A finding that there was observed no apparent peak indicates that the surface fraction of the dithiocarbamate groups of the molecular ends of HPS was extremely low.

Although, the polymerization was performed using this film in substantially the same manner as in Example 1, the formation of the grafted layer could not be confirmed.

Comparative Example 2

The (HPS/PS) blend film prepared in substantially the same manner as in Example 1 was subjected to thermal treatment in vacuum at 423K (150° C.) for 24 hours. A curve 2 in FIG. 3 shows an XPS N$_{1s}$ spectrum of the film. A finding that there was observed no N$_{1s}$ signal at all indicates that the surface fraction of the dithiocarbamate groups of the molecular ends of HPS was extremely low.

Although, the polymerization was performed using this film in substantially the same manner as in Example 1, the formation of the grafted layer could not be confirmed.

Industrial Applicability

The present invention can contribute to the development of various functional polymers utilized in various industrial fields as an invention providing a simple and inexpensive technology having versatility and capable of modifying the surface of a polymer structure.

Figure 1:
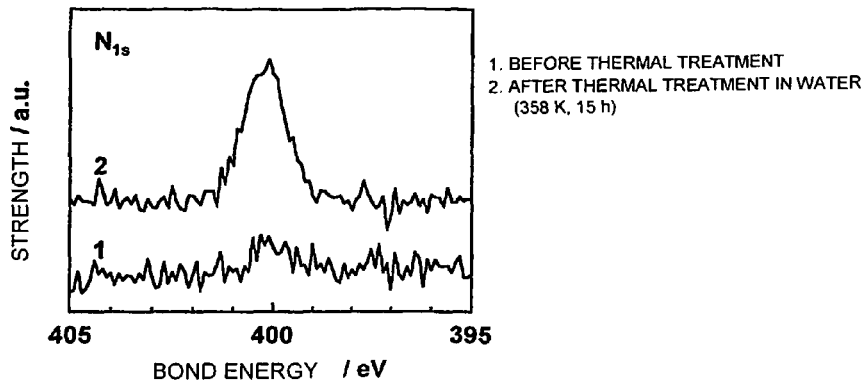
FIG. 1 is an XPS N$_{1s}$ spectrum for the blend film before and after thermal treatment in water in Example 1. Numeral 1 in the figure shows a spectrum before the thermal treatment in water and numeral 2 in the figure shows a spectrum after the thermal treatment in water.
Figure 2:
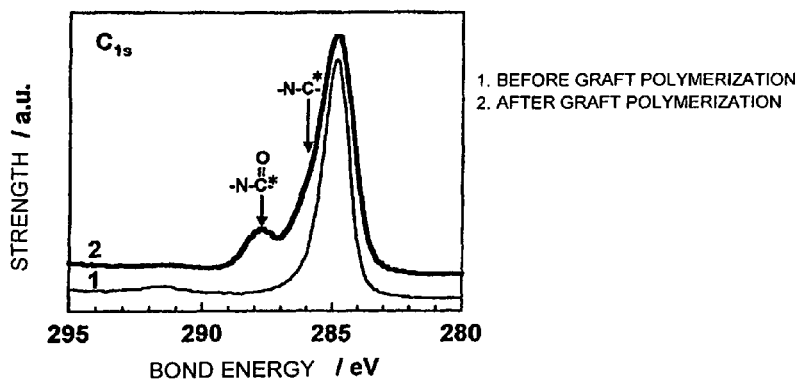
FIG. 2 is an XPS $C_{1s}$ spectrum before and after graft polymerization in Example 1. Numeral 1 in the figure shows a spectrum before the graft polymerization and numeral 2 in the figure shows a spectrum after the graft polymerization.
Figure 3:
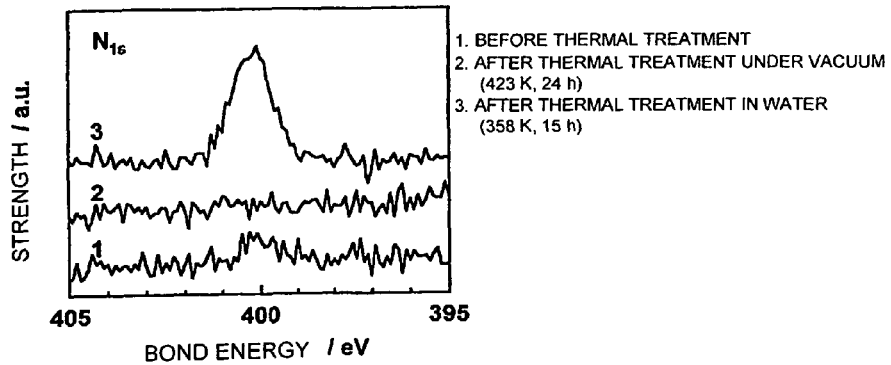
FIG. 3 is an XPS $N_{1s}$ spectrum for the blend film before and after thermal treatment in water in Example 1, Comparative Examples 1 and 2. Numeral 1 and 2 in the figure show spectra in Comparative Example 1 and Comparative Example 2, respectively, and numeral 3 in the figure shows a spectrum after the thermal treatment in water in Example 1.

The invention claimed is:

1. A process for producing a polymer structure in which a hyperbranched polymer having hydrophilic functional groups at molecular ends is contained in a matrix polymer made of a linear polymer, the process comprising:
mixing and unifying the matrix polymer and the hyperbranched polymer to form a structure containing the matrix polymer and the hyperbranched polymer; and
subjecting the obtained structure containing the matrix polymer and the hyperbranched polymer to either immersion in water and/or a hydrophilic solvent or exposure to an atmosphere of vapor of water and/or a hydrophilic solvent at a temperature falling within a range of a temperature lower than glass transition temperature of the matrix polymer by 30° C. to decomposition temperature of the matrix polymer;
wherein:
the hyperbranched polymer is concentrated around a surface and/or an interface of the polymer structure;
the hydrophilic functional groups at the molecular ends of the hyperbranched polymer are distributed in an outermost surface of the polymer structure at an enhanced density; and
the hyperbranched polymer is represented by Formula (1):

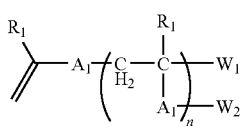

(1)

where:
$R_1$ represents a hydrogen atom or a methyl group;
$W_1$ and $W_2$ represent a dithiocarbamate group;
$A_1$ represents a group represented by Formula (2) and/or Formula (3):

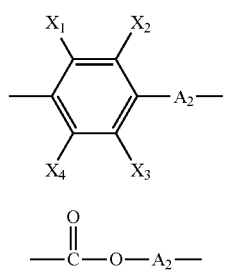

where:
$A_2$ represents a straight chain, branched or cyclic alkylene group having 1 to 30 carbon atoms which optionally contains an ether bond or an ester bond; and
$X_1$, $X_2$, $X_3$ and $X_4$ independently represent a hydrogen atom, an alkyl group having 1 to 20 carbon atoms, an alkoxy group having 1 to 20 carbon atoms, a halogen atom, a nitro group, a hydroxyl group, an amino group, a carboxyl group or a cyano group;
and
n is a number of repeating unit structures and represents an integer of 5 to 100,000.

2. The process for producing a polymer structure according to claim 1, wherein $A_1$ represents a group represented by Formula (4):

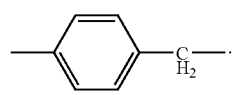

(4)

3. The process for producing a polymer structure according to claim 1, wherein $A_1$ represents a group represented by Formula (5):

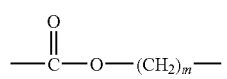

(5)

where m represents an integer of 2 to 10.

4. The process for producing a polymer structure according to claim 1, wherein $R_1$ is a hydrogen atom.

5. The process for producing a polymer structure according to claim 2, wherein $R_1$ is a hydrogen atom.

6. The process for producing a polymer structure according to claim 1, wherein the matrix polymer is at least one type selected from the group consisting of polystyrene, an AS resin, an ABS resin, an MS resin, an acrylic resin, and a methacrylic resin.

7. The process for producing a polymer structure according to claim 6, wherein the matrix polymer is polystyrene.

8. The process for producing a polymer structure according to claim 1, wherein a treating time for the immersion or the exposure is 0.001 to 100 hours.

9. The process for producing a polymer structure according to claim 1, wherein the amount of the hyperbranched polymer mixed to the matrix polymer is maximum 25% by mass to minimum 0.1% by mass, based on the mass of the matrix polymer.

10. A polymer structure in which a hyperbranched polymer having hydrophilic functional groups at molecular ends is contained in a matrix polymer made of a linear polymer,
wherein:
the hyperbranched polymer is concentrated around a surface and/or an interface of the polymer structure;
the hydrophilic functional groups at the molecular ends of the hyperbranched polymer are distributed in an outermost surface of the polymer structure at an enhanced density;
the hyperbranched polymer is represented by Formula (1):

(1)

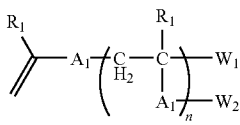

where:
R$_1$ represents a hydrogen atom or a methyl group;
W$_1$ and W$_2$ represent a dithiocarbamate group;
A$_1$ represents a group represented by Formula (2) and/or Formula (3):

(2)

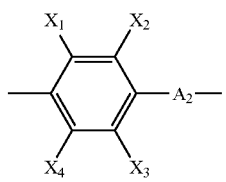

(3)

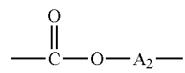

where:
A$_2$ represents a straight chain, branched or cyclic alkylene group having 1 to 30 carbon atoms which optionally contains an ether bond or an ester bond; and
X$_1$, X$_2$, X$_3$ and X$_4$ independently represent a hydrogen atom, an alkyl group having 1 to 20 carbon atoms, an alkoxy group having 1 to 20 carbon atoms, a halogen atom, a nitro group, a hydroxyl group, an amino group, a carboxyl group or a cyano group; and
n is a number of repeating unit structures and represents an integer of 5 to 100,000.

11. The polymer structure according to claim 10, wherein A$_1$ represents a group represented by Formula (4):

(4)

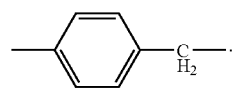

12. The polymer structure according to claim 10, wherein A$_1$ represents a group represented by Formula (5):

(5)

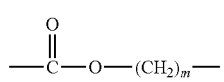

where m represents an integer of 2 to 10.

13. The polymer structure according to claim 10, wherein R$_1$ is a hydrogen atom.

14. The polymer structure according to claim 11, wherein R$_1$ is a hydrogen atom.

15. The polymer structure according to claim 10, wherein the matrix polymer is at least one type selected from the group consisting of polystyrene, an AS resin, an ABS resin, an MS resin, an acrylic resin, and a methacrylic resin.

16. The polymer structure according to claim 15, wherein the matrix polymer is polystyrene.

17. A process for producing a grafted polymer structure which is a polymer structure in which a hyperbranced polymer having hydrophilic functional groups at molecular ends is contained in a matrix polymer made of a linear polymer, the process comprising:
mixing and unifying the matrix polymer and the hyperbranched polymer to form a structure containing the matrix polymer and the hyperbranced polymer;
subjecting the obtained structure containing the matrix polymer and the hyperbranched polymer to either immersion in water and/or a hydrophilic solvent or exposure to an atmosphere of vapor of water and/or a hydrophilic solvent at a temperature falling within a range of a temperature lower than glass transition temperature of the matrix polymer by 30° C. to decomposition temperature of the matrix polymer; and
graft-polymerizing vinyl polymer chains to the hydrophilic functional groups positioned in an outermost surface of the treated structure;
wherein:
the hyperbranched polymer is concentrated around a surface and/or an interface of the polymer structure;
the hydrophilic functional groups at the molecular ends of the hyperbranched polymer are distributed in the outermost surface of the polymer structure at an enhanced density and the vinyl polymer chains are grafted to at least a part of the hydrophilic functional groups; and
the hyperbranched polymer is represented by Formula (1):

(1)

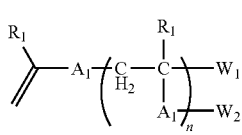

where:
R$_1$ represents a hydrogen atom or a methyl group;
W$_1$ and W$_2$ represent a dithiocarbamate group;
A$_1$ represents a group represented by Formula (2) and/or Formula (3):

(2)

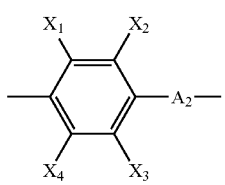

(3)

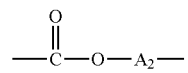

where:
A$_2$ represents a straight chain, branched or cyclic alkylene group having 1 to 30 carbon atoms which optionally contains an ether bond or an ester bond; and
X$_1$, X$_2$, X$_3$ and X$_4$ independently represent a hydrogen atom, an alkyl group having 1 to 20 carbon atoms, an alkoxy group having 1 to 20 carbon atoms, a halogen atom, a nitro group, a hydroxyl group, an amino group, a carboxyl group or a cyano group;

and n is a number of repeating unit structures and represents an integer of 5 to 100,000.

18. The process for producing a grafted polymer structure according to claim 17, wherein $A_1$ represents a group represented by Formula (4):

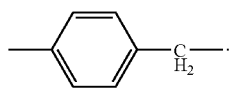

(4)

19. The process for producing a grafted polymer structure according to claim 17, wherein $A_1$ represents a group represented by Formula (5):

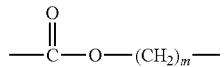

(5)

where m represents an integer of 2 to 10.

20. The process for producing a grafted polymer structure according to claim 17, wherein $R_1$ is a hydrogen atom.

21. The process for producing a grafted polymer structure according to claim 18, wherein $R_1$ is a hydrogen atom.

22. The process for producing a grafted polymer structure according claim 17, wherein the matrix polymer is at least one type selected from the group consisting of polystyrene, an AS resin, an ABS resin, an MS resin, an acrylic resin, and a methacrylic resin.

23. The process for producing a grafted polymer structure according to claim 22, wherein the matrix polymer is polystyrene.

24. The process for producing a grafted polymer structure according to claim 17, wherein a treating time for the immersion or the exposure is 0.001 to 100 hours.

25. The process for producing a grafted polymer structure according to claim 17, wherein the amount of the hyperbranced polymer mixed to the matrix polymer is maximum 25% by mass to minimum 0.1% by mass, based on the mass of the matrix polymer.

26. The process for producing a grafted polymer structure according to claim 17, wherein each of the vinyl polymer chains is grafted by a living radical polymerization.

27. The process for producing a grafted polymer structure according to claim 26, wherein a polymerization time for the living radical polymerization is 0.01 to 100 hours.

28. The process for producing a grafted polymer structure according to claim 26, wherein a polymerization time for the living radical polymerization is 0.1 to 100 hours.

29. The process for producing a grafted polymer structure according to claim 26, wherein a polymerization temperature for the living radical polymerization is 0 to 200° C.

30. The process for producing a grafted polymer structure according to claim 17, wherein each of the vinyl polymer chains is formed from acrylamides or methacrylamides.

31. A grafted polymer structure which is a polymer structure in which a hyperbranched polymer having hydrophilic functional groups at molecular ends is contained in a matrix polymer made of a linear polymer, wherein:

the hyperbranched polymer is concentrated around a surface and/or an interface of the polymer structure;

the hydrophilic functional groups at the molecular ends of the hyperbranched polymer are distributed in an outermost surface of the polymer structure at an enhanced density;

vinyl polymer chains are grafted to at least a part of the hydrophilic functional groups; and the hyperbranched polymer is represented by Formula (1):

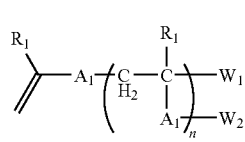

(1)

where:

$R_1$ represents a hydrogen atom or a methyl group;

$W_1$ and $W_2$ represent a dithiocarbamate group;

$A_1$ represents a group represented by Formula (2) and/or Formula (3):

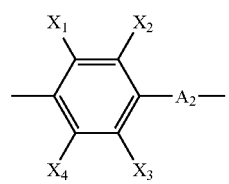

(2)

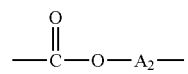

(3)

where:

$A_2$ represents a straight chain, branched or cyclic alkylene group having 1 to 30 carbon atoms which optionally contains an ether bond or an ester bond; and $X_1$, $X_2$, $X_3$ and $X_4$ independently represent a hydrogen atom, an alkyl group having 1 to 20 carbon atoms, an alkoxy group having 1 to 20 carbon atoms, a halogen atom, a nitro group, a hydroxyl group, an amino group, a carboxyl group or a cyano group);

and n is a number of repeating unit structures and represents an integer of 5 to 100,000.

32. The grafted polymer structure according to claim 31, wherein $A_1$ represents a group represented by Formula (4):

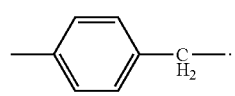

(4)

33. The grafted polymer structure according to claim 31, wherein $A_1$ represents a group represented by Formula (5):

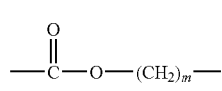

(5)

(where m represents an integer of 2 to 10).

34. The grafted polymer structure according to claim 31, wherein $R_1$ is a hydrogen atom.

35. The grafted polymer structure according to claim 32, wherein $R_1$ is a hydrogen atom.

36. The grafted polymer structure according to claim 31, wherein the matrix polymer is at least one type selected from the group consisting of polystyrene, an AS resin, an ABS resin, an MS resin, an acrylic resin, and a methacrylic resin.

37. The grafted polymer structure according to claim 36, wherein the matrix polymer is polystyrene.

38. The grafted polymer structure according to claim 31, wherein each of the vinyl polymer chains is formed from acrylamides or methacrylamides.

39. The grafted polymer structure according to claim 31, wherein each of the vinyl polymer chains is grafted by a living radical polymerization.

* * * * *